Figure 1:
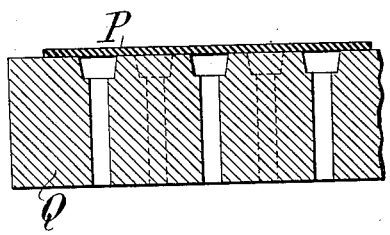

M. C. SCHWEINERT & H. P. KRAFT.
METHOD OF APPLYING RUBBER WASHERS TO VALVES OR THE LIKE.
APPLICATION FILED JULY 25, 1914.

1,177,902.

Patented Apr. 4, 1916.

WITNESSES:
René Bruine
Fred White

INVENTORS:
Maximilian Charles Schweinert
and Henry P. Kraft,
By Attorneys,
Fraser Turk & Myers

UNITED STATES PATENT OFFICE.

MAXIMILIAN CHARLES SCHWEINERT, OF WEST HOBOKEN, AND HENRY P. KRAFT, OF RIDGEWOOD, NEW JERSEY.

METHOD OF APPLYING RUBBER WASHERS TO VALVES OR THE LIKE.

1,177,902.

Specification of Letters Patent.

Patented Apr. 4, 1916.

Application filed July 25, 1914. Serial No. 853,220.

*To all whom it may concern:*

Be it known that we, MAXIMILIAN CHARLES SCHWEINERT, of West Hoboken, in the county of Hudson and State of New Jersey, and HENRY P. KRAFT, of Ridgewood, in the county of Bergen and State of New Jersey, both citizens of the United States of America, have invented certain new and useful Improvements in Methods of Applying Rubber Washers to Valves or the like, of which the following is a specification.

This invention relates particularly to valves for pneumatic tires or similar purposes, and aims to provide certain improvements therein.

In the well-known Schrader type of valve the structure comprises a valve casing which is adapted to be connected with a tire or inner tube, and the valve mechanism is located entirely within the casing. The valve mechanism comprises a valve seat member usually provided with a swiveled screw-threaded plug by which it is held in the casing, and a valve proper below the seat member. The valve proper is usually loaded with a spring and a pin is provided passing entirely through the structure, by means of which the valve proper is depressed for deflation or in the operation of gaging the pressure. Such pin is so constructed as to hold all of the parts of the valve mechanism together. By reason of the limited space available, the valve mechanism is extremely small, and the rubber packing which is utilized to make a tight joint between the valve seat and the valve casing is hence very thin, and easily distorted. A certain proportion of leaky valves occur from the distortion of the packing, and frequently when the valve mechanism is removed it is found that the rubber has stuck to the casing and has stripped from the valve seat. The valve proper is also provided with a rubber washer which makes contact with the valve seat, and this washer is also so small as to occasion trouble.

It has been found in practice that if these packings are made of a semi-cured rubber, or a rubber cured sufficiently to be cut and handled, and that if the final curing or vulcanizing operation is performed after the packings are adjusted in their proper places on the valve mechanism, they will be much more serviceable in use than as heretofore constructed. By this means the packings are caused to adhere or partially cure on the metal surfaces, so that they are not easily dislodged. A further advantage is that the packings may be vulcanized to a harder condition than would be possible if the vulcanizing took place initially, since the packings are required to be stretched in order to spring into position when they are applied to the valve mechanism.

Figure 2:
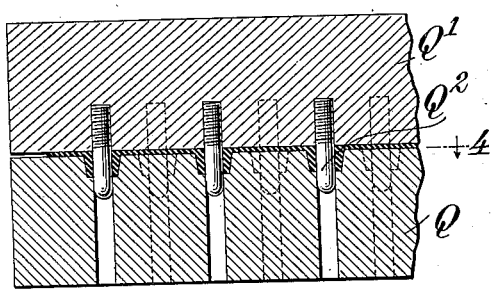
Figure 3:
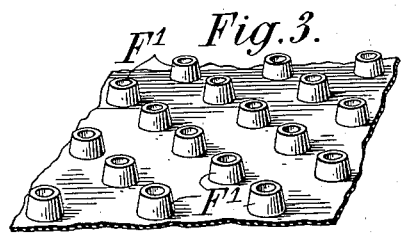
Figure 4:
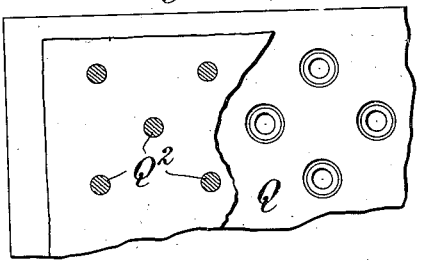
Figure 6:
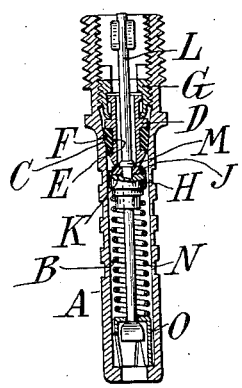
Figure 5:
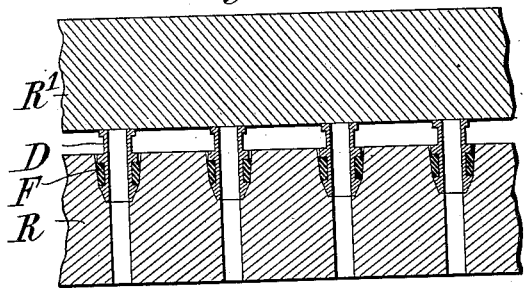

Referring to the accompanying drawings, wherein is illustrated the invention as applied to valve seats,—Figure 1 is a sectional view of a mold, illustrating the first step in the formation of the packings; Fig. 2 is a similar view at the end of the first vulcanizing operation; Fig. 3 is a perspective view of the sheet as it comes from the mold of Fig. 2; Fig. 4 is a section on the line 4—4 in Fig. 2; Fig. 5 is a sectional view of the seat member during a second vulcanizing operation; Fig. 6 is a sectional view of the complete valve.

Referring first to Fig. 6, which illustrates the common form of Schrader valve, let A indicate the casing, the lower end of which is adapted to be attached to a pneumatic tire or tube. The casing is provided with a longitudinal bore B, the upper end of which is screw-threaded, and below the screw-threaded portion is a tapered shoulder or seat C. The valve seat member D is formed with a circumferential groove E which receives a packing washer or gasket F designed to contact with the tapered shoulder C. The seat member D is swiveled to a screw-threaded plug G, by means of which the seat member is pressed downwardly until a tight joint is made. The valve proper H is located beneath the seat member D and carries a rubber packing or gasket J which fits in a shallow recess K in the body of the valve. Passing through the valve body and upwardly through the seat member D and plug G is a pin L which is formed with an enlargement M which is above the packing J, which enlargement serves to assist in holding the packing in place. The pin is continued downwardly through the loading spring N and a spring guide O, as shown. Each end of the pin is upset or swaged so as to enlarge it, and the pin serves to hold all of the parts of the valve mechanism together.

It will be observed from Fig. 6 which is about twice the normal size that the packing washer F is necessarily of thin rubber shaped to tubular form, and that the shoulders forming the sides of the groove at the top and bottom are small. These shoulders with the contractibility of the washer constitute the only means of holding the packing in place. As the packing has been heretofore applied after having been fully vulcanized, it could not be of any considerable hardness since it would then be apt to be broken in springing it apart to the necessary extent to enable it to pass the flanged lower end of the seat member in adjusting it in place. It has hence been found in practice that the packings vary considerably, and are apt to become distorted in use. This is particularly true after the valve mechanism has been in place for a short time, and the packing has adhered to the seat C.

Figs. 1 to 5 illustrate the present invention. The packing washers F may be formed in any suitable way, as for instance that illustrated in Figs. 1 to 4, wherein a sheet of rubber P of proper composition is laid over a mold Q, and a complementary mold Q' bearing pins Q² is pressed downwardly on top of the sheet, the pins entering proper recesses in the mold Q. The molds are then put in a vulcanizing press and subjected to a partial vulcanizing operation. Good results are obtained when the molds are left in the press five minutes under fifty pounds of steam pressure. Fig. 3 illustrates a sheet of rubber as it comes from the first molding operation, the washers in the main projecting from the sheet as shown at F'. In this condition the washers are elastic, and much too soft for practical purposes. They are then severed from the sheet and sprung over the lower flange of the seat member D. The seat member with the washer thereon is then subjected to the second vulcanizing operation, which is illustrated in Fig. 5. The seat members are placed in a mold R and a top plate R' is pressed downwardly on top of the seat members, and the whole is then inserted in a vulcanizing press, and subjected to a vulcanizing operation of about twenty-five minutes under fifty pounds of steam pressure.

Preferably the second vulcanizing operation is carried far enough so that the washers are hardened beyond the point possible if they were fully vulcanized before being adjusted in place on the valve seats. Since they are already in place when the second vulcanizing operation is effected, this loss of elasticity is not detrimental, but on the contrary is of value, particularly with the extremely thin rubber necessarily employed. The washers hold their shape much better than heretofore, and are not easily distorted or sprung out of place. It has also been found that the washers are less liable to adhere to the seat C under these circumstances.

The valve seats and other parts are commonly made of brass, and it is necessary to nickel-plate them in order to protect them from corrosion. According to the present invention this nickel-plating operation is deferred until the washer is vulcanized in place. It has been found that the seats or other parts may then be safely nickel-plated without in any way affecting the washers. While the nickel-plating might be done prior to the application of the washer, it is desirable not to do so, since the rubber adheres very much more effectively to the brass surface than to a nickel-plated surface.

The invention as thus described is easily applicable to the valve proper H. When the washer J is adjusted in place, it must expand so as to pass over the shoulder or enlargement M and contract into position beneath it in the recess K. By the present invention this may be done after the first vulcanizing operation. When the second vulcanizing operation has been completed, the washer is hardened and caused to adhere to the metal, so that it is difficult to dislodge it, and the washer hence holds its position to a greater extent than heretofore, and is more durable in use.

The invention may be applied to other small articles, particularly where the rubber or rubber composition is small or thin.

What we claim is:—

1. The process of making and applying rubber washers to valve seats or the like, comprising forming a washer which is partially vulcanized, adjusting the washer in place upon the valve seat or the like, and then subjecting it to a second vulcanizing operation to further harden the rubber.

2. The process of making and applying rubber washers to valve seats or the like, comprising forming a washer from a partially vulcanized rubber material, adjusting the washer in place upon the valve seat or the like, and then subjecting it to a second vulcanizing operation to further harden the rubber.

3. The process of making and applying rubber washers to valve seats or the like, comprising subjecting substantially raw rubber to a vulcanizing operation while forming the washers, partly curing the washers, adjusting them in place on the valve seats or the like, and then subjecting them to a second vulcanizing operation while in place.

4. The process of making and applying rubber washers to devices having grooves into which the rubber is sprung comprising subjecting substantially raw rubber to a vulcanizing operation while forming the washers, partly curing the washers, springing them into place in the grooves, and then subjecting them to a second vulcanizing operation and hardening them to a sufficient extent to prevent their springing out of the grooves.

5. The process of making and applying rubber washers for valve seats or the like, comprising subjecting the washer to a vulcanizing operation in a vulcanizing press at about fifty pounds pressure for about five minutes, then adjusting the washer in place upon the valve seat or the like, and then subjecting it to a second vulcanizing operation at a similar pressure for about twenty-five minutes.

In witness whereof we have hereunto signed our names in the presence of two subscribing witnesses.

MAXIMILIAN CHARLES SCHWEINERT.
HENRY P. KRAFT.

Witnesses:
E. V. MYERS,
FRED WHITE.